2,720,461

PRINTING INK AND VARNISH THEREFOR

Andries Voet, Borger, Tex., assignor to J. M. Huber Corporation, Locust, N. J., a corporation of New Jersey No Drawing. Application May 14, 1952,
Serial No. 287,807

20 Claims. (Cl. 106—30)

This invention relates to quick setting printing inks and varnishes therefor.

Printing inks consist of a varnish and a coloring agent, the combination forming a mixture with flow characteristics which permit its distribution over the printing plate and its transfer from the printing plate to the surface to be printed. The varnish is usually a solution of a binder for the coloring agent in a liquid vehicle. The liquid vehicle is usually an organic solvent or mixture of organic solvents, which may be diluted with limited amounts of water. Ordinary news ink is composed largely of mineral oil and carbon black to which a wetting agent and binder, such as gilsonite or rosin, is added to produce the desired flow characteristics. Such inks, when applied to a porous surface, dry by absorption of the oil into the printed material and filtration of the carbon black which remains on the surface. Other non-penetrating inks dry by evaporation of the solvent at room temperature or at elevated temperatures, by oxidation of the vehicle, or by precipitation of resins from the solvents by the application of moisture. This type of ink is exemplified by U. S. Patent No. 2,118,431 to Albert E. Gessler.

Two main types of quick setting printing inks are known in the art. Vapor set inks are prepared by dissolving water-insoluble resins in a water-miscible solvent. The ink is set, after being printed, by exposing the printed sheet to steam or water mist. The water mixes with the water-miscible solvent, such as diethylene glycol, until the resin is no longer soluble in the mixture and becomes precipitated. Such inks will remain unchanged on the distributing system of a press for considerable periods of time because the solvents are usually only very slightly volatile. However, if the atmosphere becomes too humid, the ink absorbs moisture and precipitates. Heat set inks are produced with solutions of resins in volatile solvents. In this case, the solvent, such as a petroleum oil, cannot be too volatile or it will evaporate on the distributing system. The oils used in practice may distill between 450° F. and 550° F. or, in some cases, even higher. In order to dry a sheet printed with such ink in a fraction of a second, it is necessary to heat the sheet to a temperature such that the quality of the sheet is considerably impaired.

It is an object of my present invention to provide novel ink varnishes which are suitable for the preparation of printing inks which are press stable. Another object is to provide printing inks and varnishes which can be dried rapidly without causing deterioration of the paper. A further object is to provide printing inks and varnishes which may be set rapidly by any one of a plurality of methods best suited to the conditions of printing. Other objects are to provide new compositions of matter and to advance the art. Still other objects will appear hereinafter.

The above and other objects may be accomplished in accordance with my invention which comprises dissolving certain resin salts in suitable liquid vehicles to produce ink varnishes, and employing such ink varnishes for the preparation of printing inks by incorporating coloring agents therein. The resin salts are those formed by neutralizing a water-insoluble acidic resin, which has an acid number of at least 90, with a nitrogenous base which has a basic dissociation constant greater than $1 \times 10^{-5}$. The liquid vehicle is composed of at least one neutral water-miscible aliphatic organic solvent in which the free resin is insoluble and which is a member of the class of formamide and alcohols, glycols, ethers of glycols and esters of glycols which contain from 2 to 8 carbon atoms and only carbon, hydrogen and oxygen, and mixtures of such organic solvents with water.

The inks and varnishes of my invention can be set very quickly by a variety of methods. The resins are relatively weak acids and the salts thereof of my invention are not highly stable but readily decompose under suitable conditions to liberate the free resin which is insoluble in the liquid vehicle employed. The salts are sufficiently stable in the solutions of my invention to permit the solutions to be used in the usual printing processes but, when in the form of thin films, such as printed films, they decompose during drying, upon the application of a moderate amount of heat, upon the application of moisture in the form of steam or a water mist, or upon the addition of acidic substances having a dissociation constant greater than about $1 \times 10^{-5}$. Ordinarily, the amounts of heat required will be less than that necessary to evaporate the liquid vehicle and the temperatures will be below those which will deleteriously affect the quality of the material upon which the ink is printed and below the melting point of the resin. Such decomposition of the resin salts liberates free base which is volatilized into the atmosphere and carried away by the air currents, and free resin which is insoluble in the liquid vehicle and which precipitates upon the printed sheet or is filtered out of the liquid vehicle by the sheet through diffusion of the liquid vehicle into the sheet. Thereby, the resin, and the coloring material of the ink are deposited mainly upon the surface of the sheet, whereby the printed film has a very considerable gloss. This is a particularly valuable advantage over the heat set inks which depend upon rapid volatilization of the solvent and hence require temperatures above the melting point of the resin, resulting in penetration of the molten resin into the sheet with loss of gloss.

When the printed films are set by steam, the salt is decomposed, partly by heat and partly by hydrolysis, and the free base is carried away by the steam. When water mist is employed, the salt is decomposed by hydrolysis, caused by the large excess of water, and the free base is carried away by the flow of the excess water.

The resins, which are employed as the salts in accordance with my invention, are the water-insoluble resins which have an acid number of at least 90. Resins of lower acid numbers are generally unsuitable, usually failing to form salts or forming salts which are insoluble in the organic solvents or which are insufficiently soluble in the solvents, particularly with some of the amines of my invention. The resins may be natural or synthetic resins such as rosin, polymerized rosin, disproportioned rosin, hydrogenated rosin, adduct compounds of rosin with alpha-beta unsaturated dicarboxylic acids, copal, sandarac, alkyd resins, adduct compounds of terpenes and alpha-beta unsaturated dicarboxylic acids, and partly esterified resins. The alpha-beta unsaturated dicarboxylic acids, which are used in preparing adduct compounds of the resins, will usually be maleic acid or fumaric acid, although others are suitable, such as citraconic acid, mesaconic acid, aconitic acid and itaconic acid. I generally prefer the natural resins in their modified and unmodified forms and, particularly, rosin (acid No. 90–180), polymerized rosin (acid No. about 150), disproportioned rosin (acid No. about 150), and hydrogenated rosin (acid No. about 160).

The nitrogenous bases, which are employed to form the resin salts of my invention, have a dissociation constant greater than $1 \times 10^{-5}$. Strong non-nitrogenous bases, such as sodium hydroxide, produce water-soluble films. Weaker bases, such for example as hydroxylamine with a dissociation constant of $1 \times 10^{-8}$ and aromatic amines, do not form resin salts or form resin salts which will not dissolve satisfactorily in the solvents or solvent mixtures. Representative bases, which have dissociation constants greater than $1 \times 10^{-5}$ and which are satisfactory for use in accordance with my invention, are:

| | |
|---|---|
| Ammonia | Propylene diamine |
| Methyl amine | Ethanol amine |
| Ethyl amine | Hexyl amine |
| Dimethyl amine | Lauryl amine |
| Diethyl amine | Diethanol amine |
| n-Butyl amine | Triethanol amine |
| Di-n-butyl amine | Morpholine |
| Triethyl amine | Piperidine |
| Ethylene diamine | Propyl amine |
| Diethylene triamine | Isopropyl amine |
| Triethylene tetramine | Isobutyl amine |
| Tetraethylene pentamine | |

The following bases have dissociation constants less than $10^{-5}$ and are unsatisfactory for producing resin salts for use in my invention:

| | |
|---|---|
| Aniline | Beta-naphthylamine |
| p-Toluidine | m-Phenylene diamine |
| Pyridine | p-Phenylene diamine |
| Quinoline | Hydroxylamine |
| Dibenzyl amine | Hexamethylene tetramine |
| Alpha-naphthylamine | Urea |

The base, to be used in any particular case, will depend upon the conditions under which the ink is to be used. Usually, it will be preferred to employ an amine which is less volatile than propyl amine, i. e., which has a vapor pressure lower than 100 mm. of mercury at 20° C. The more volatile amines and ammonia, while forming satisfactory resin salts, are slowly lost from the ink on the distributing system of the press and produce inks with less press stability than is sometimes desired. However, such volatile bases are desirable where the ink is to be dried and set at atmospheric temperatures and pressures as, under such conditions, the base readily and rapidly leaves the printed films, leaving the free resin as the binder. Amines, having a vapor pressure of from 100 to 460 mm. of mercury at 20° C., are most suitable in inks which are to be used on conventional letter-press types of presses. The more volatile bases, having a vapor pressure higher than 460 mm. of mercury at 20° C., are suitable for preparing inks to be used with gravure or aniline types of presses.

The preferred inks and varnishes of my invention are those which have greater press stability, remaining open on the press for about 15 minutes or more. The term "open" means that the ink is in a fluid condition suitable for proper distribution on the press and for printing. An ink, which is not "open," has partly or completely set on the press, is usually too tacky for proper printing, or may even have completely solidified on the forms and the rollers. In order to produce inks and varnishes having such press stability, the base should be an amine which has a vapor pressure lower than 100 mm. of mercury at 20° C. Such inks are set most conveniently by heat, moisture, acid or a combination of two or more thereof. Where the ink or varnish is to be set quickly by heat alone, the base preferably should be an amine having a vapor pressure of from 0.4 to 100 mm. of mercury at 20° C. The less volatile amines require prolonged heating or undesirably high temperatures and are more conveniently set quickly by the application of moisture, acidic substances, or both.

When the varnishes and inks are to be set by moisture or acidic substances, the base preferably will have a vapor pressure lower than 0.4 mm. of mercury at 20° C. The moisture may be in the form of steam or a water mist, but preferably will be steam. The acidic substances must have a dissociation constant greater than about $1 \times 10^{-5}$, represented by formic acid, acetic acid and sulfur dioxide. More weakly acidic substances, such as carbonic acid, are unsuitable. Preferably, such acidic substances are applied in vapor form admixed with steam or in aqueous solution, as they are more effective when so applied, such combination also being more effective than either steam or moisture alone.

Preferably, the amount of base, employed to form the salts of my invention, will be about that theoretically required to completely neutralize the acidity of the resin. As little as 0.75 of the theoretical amount of the base will usually result in a satisfactory solution, but materially smaller amounts will not. Large excessive amounts of base can be employed, except when the ink or varnish is to be set by moisture or when the base is volatile only at undesirably high temperatures. When the amount of base is equal to twice that theoretically required to completely neutralize the acidity of the resin, it will, in most cases, entirely prevent the setting of the varnish or ink by moisture. Also, material excesses of base are, in most cases, wasteful and uneconomical. Usually, the amount of base will be from 0.75 to about 1.25 of the theoretical.

The amine salts are readily formed by one who is skilled in the art. It is only necessary to bring the resinous substances and the amine together under conditions such that they can mix. In some cases, the resin can be melted and the amine can then be stirred directly into the melted resin. In case the amine is somewhat volatile, it may be dissolved in the solvent, intended to form the solution of the amine salt, and the acidic resin can then be stirred into this solution until it becomes completely dissolved.

The organic solvents, to be employed as the liquid vehicles in accordance with my invention are the neutral water-miscible aliphatic organic solvents in which the free resin is insoluble. The solubilities and insolubilities of the natural resins in the organic solvents are well-known to the art and are disclosed in "The Technology of Natural Resins" by Mantell et al. published by John Wiley and Sons in 1942. The solubilities and insolubilities of the synthetic resins are also well-known to the art and are published by the manufacturers of the particular resins.

Suitable solvents are alcohols, formamide and the glycols, ethers of the glycols, and esters of the glycols. The glycols, ethers of glycols and esters of glycols, which contain from 2 to 8 carbon atoms and only carbon, hydrogen and oxygen, will generally be preferred, including the poly glycols. However, poly glycols, having a molecular weight of about 600 and above, are not water-miscible and hence will not be suitable. Representative glycols and their ethers and esters, which are satisfactory are ethylene glycol, diethylene glycol, triethylene glycol, dipropylene glycol, butylene glycol-1,2, hexylene glycol, cellosolve, butyl cellosolve, monobutyl ether of ethylene glycol, monomethyl ether of ethylene glycol, monoethyl ether of ethylene glycol, monomethyl ether of diethylene glycol, monoethyl ether of diethylene glycol, monobutyl ether of diethylene glycol, ethylene glycol monomethyl ether acetate, diethylene glycol monoethyl ether acetate and triethylene glycol methyl ether acetate.

Each of the free resins, individually, is soluble in one or more of such solvents but is insoluble in others, as is well-known to the art, and the solvent or mixture of solvents to be employed with any particular resin will be selected to provide a medium in which such resin is insoluble. Such medium may be a mixture of nonsolvents and solvents for the free resin.

The printing inks and varnishes of my invention may contain no water. However, for economic reasons, it is frequently desirable to produce inks and varnishes in which water forms a portion of the liquid vehicle. Also, the more volatile water-soluble bases are most conveniently handled and available in aqueous solution. In general, the solutions of the resin salts of my invention in the organic solvents are compatible with limited quantities of water, similarly to the previously known inks and varnishes which contain free resins or resin salts, i. e., such amounts of water can be added to the solutions without immediate precipitation of the resin or its salt. However, excesive quantities of water tend to precipitate the salt or to cause the resin salt to hydrolyze and gradually precipitate free resin. The amount of water, which will be tolerated in any particular case, will depend upon the organic solvent, the concentration of the resin salt, and the amount and basic strength of the base, and can be readily determined by one skilled in the art.

The amount of resin salt, employed in the ink or varnish, will depend upon the viscosity desired in the varnish and in the ink prepared therefrom. Usually, the resin salt will be dissolved in the liquid vehicle in a concentration of from about 20% to about 75% by weight and, preferably, from about 40% to about 60% by weight.

The varnishes of my invention may be employed in any conventional manner for the preparation of printing inks by incorporating the usual coloring materials therein. Colored pigments may be incorporated into the varnishes by means of a roller mill or a ball mill, or wet filter cakes of the pigment may be stirred into the varnish and dispersed therein. In other cases, the ink may be formed by the addition to the varnish of soluble dyestuffs as the coloring agents. Suitable pigments include carbon black, titanium dioxide, red pigment, milori blue, and the like.

The amount of pigment employed will be that ordinarily used to provide inks of the desired color and viscosity. Usually, the pigment will be in a proportion of from about 2% to about 60% by weight based on the liquid medium of the varnish. In the case of carbon black, the amount will be from about 2% to about 31% by weight of the liquid medium and, preferably, from about 9% to about 31%.

In order to more clearly illustrate my invention, preferred modes of carrying the same into effect, and the advantageous results to be obtained thereby, the following examples are given, in which amounts are by weight except where otherwise specifically indicated.

Example I

Forty parts of polymerized rosin were added to 54 parts of ethylene glycol and the mixture was heated to 130° C. The rosin became melted but did not dissolve. The mixture was then cooled to 100° C. and 6 parts of a 70% aqueous solution of ethylene diamine were added with stirring. The amine is approximately that required to neutralize the rosin. The rosin dissolved rapidly to form a smooth viscous solution. When cooled, the varnish was of the consistency of heavy syrup.

Example II

Forty parts of polymerized rosin were added to a mixture of 25 parts diethylene glycol, 5 parts of isopropanol and 7.5 parts of water at 100° C. The rosin did not dissolve. When 16.1 parts of triethanol amine were added, the rosin dissolved. The amine is approximately that required to neutralize the rosin. The resulting product, when cooled, was a smooth viscous varnish.

Example III

An ink varnish was prepared similarly to Example I from the following ingredients in the absence of water:

50 parts of water-white rosin
42 parts of ethylene glycol
8 parts of diethyl amine

Example IV

An ink varnish was prepared by heating 40 parts of a maleic modified rosin having an acid number of 320 with 52 parts of glycerine at 160–170° C. while the mixture was agitated. The resin melted and formed a coarse dispersion in the liquid. To such dispersion was added 8 parts of monoethanolamine. The resin dissolved immediately and, on cooling, formed a stable varnish.

Example V

A varnish is prepared as in Example I from the following materials in the absence of water, and has similar properties:

45 parts of water-white rosin
25 parts of glycerol
20 parts of ethylene glycol
10 parts of morpholine

Example VI

A varnish is prepared from the following materials:

40 parts of polymerized rosin
28 parts of triethylene glycol
25 parts of formamide
7 parts of propylene diamine The rosin is dissolved in the glycol at 130° C. Formamide is added to the agitated solution, causing precipitation of the resin in a finely divided form. After cooling the mixture to 110° C., the amine is added thereto slowly, resulting in the formation of a clear, stable varnish. Alternatively, the amine and the formamide may be first mixed and then added to the resin solution at 110° C.

Example VII

An alkyd resin may be prepared from the following:

65 parts of phthalic anhydride
22 parts of diethylene glycol
13 parts of ethylene glycol The materials are mixed and heated at 185° C. under reflux for 4 hours. The unreacted materials are removed by steam distillation. A medium soft resin of an acid number of 120 is formed which is insoluble in ethylene glycol.

Fifty parts of this resin are heated with 47 parts of ethylene glycol to 100° C. Seven parts of ethanolamine are added, resulting in the formation of a clear stable varnish.

Example VIII

An alkyd resin was formed by heating 2 parts of phthalic anhydride with one part of propylene glycol at 185° C. for 2 hours, followed by heating for aperiod of one hour at 200° C. under reflux. After elimination of unreacted materials by means of steam distillation, a hard white resin of an acid number of 105 resulted. This resin is insoluble in glycerol, but its morpholine salt, made by heating the resin with the equivalent quantity of morpholine, is soluble in glycerol.

Example IX

A varnish was prepared from the following:

| | Parts |
|---|---|
| "Vinsol" | 40 |
| Hexylene glycol | 20 |
| Diethylene glycol monobutyl ether | 10 |
| Glycerol | 25 |
| Ethylene diamine, 70% in water | 5 |

The "Vinsol," a dark acidic resinous material obtained as the gasoline insoluble rosin fraction in the refining of wood rosin and having an acid number of 90, is dissolved in the hexylene glycol (2-methyl-2,4-pentane diol) and the glycol ether at 130° C. If the indicated quantity of glycerol is added, precipitation occurs instantaneously.

By adding a mixture of the glycerol and the amine at 100° C., however, the amine salt is formed and a clear, stable varnish results.

Example X

A maleic modified rosin of an acid number of 320 may be partly esterified by heating at 180° C.–200° C. with glycerol. One such part-glyceride of maleic modified rosin was prepared with a melting point of 155° C. and an acid number of 110. Of this resin, 40 parts were heated to 165° C. with 50 parts of ethylene glycol while the mixture was agitated. The mixture was then cooled to 120° C. and 10 parts of morpholine were slowly added, resulting in the formation of a stable, clear varnish.

Example XI

An acidic resin is prepared by reacting 5 parts of alpha terpinene with 3 parts of maleic anhydride at 180° C. for 5 hours. The product is purified by steam distillation in vacuo. A soft resinous solid is obtained, having an acid number of 520. This resin is insoluble in a mixture of 70 parts of ethylene glycol and 30 parts of water. However, when heated with an equivalent quantity of ethylene diamine at 100° C. in the glycol-water mixture, a clear stable solution of the amine salt is obtained.

Example XII

A suitable ink varnish was prepared similarly to Example I from the following ingredients:

40 parts of polymerized rosin
20 parts of propylene glycol
33 parts of ethylene glycol
7 parts of ammonia as a 29% aqueous solution Any of the varnishes of Examples I to XII may be pigmented with suitable pigments or colored with dyestuff to form inks.

Example XIII

An ink was prepared from the following ingredients:

| | Parts |
|---|---|
| Varnish of Example I | 60 |
| Monastral blue | 9 |
| Titanium dioxide | 21 |
| Ethylene glycol | 10 |

The materials are mixed and the mixture is given 2 passes on a roller mill. An excellent stable typographic printing ink results.

Example XIV

An ink was prepared similarly to Example XIII from the following materials:

| | Parts |
|---|---|
| Varnish of Example IX | 60 |
| Carbon black | 18 |
| Hexylene glycol | 22 |

This is a quick setting stable typographic printing ink.

Example XV

An ink was prepared similarly to Example XIII from the following materials:

| | Parts |
|---|---|
| Varnish of Example VI | 70 |
| Lithol red | 18 |
| Triethylene glycol | 10 |
| "Carbowax 5000" | 2 |

This ink is an excellent typographic printing ink. "Carbowax 5000" is the trade name for a solid polyethylene glycol having an average molecular weight of about 5000.

The varnishes of this invention and inks prepared from them are capable of being set by at least three different methods, all of which depend upon the decomposition of the salt and the liberation of the free resin which is no longer soluble in the solvent or mixture of solvents employed.

The first method consists in the application of heat. Unlike conventional heat set inks, the process does not depend on volatilization of the solvent but depends on the generation of the free resin which becomes insoluble and permits the solvent to diffuse into the paper. The salts readily decompose under the application of heat to liberate free resin and free base. During the drying operation, this base can be detected by means of indicator paper above the surface of the drying film. If this liberated base is removed as it forms, the entire resin salt will be decomposed to liberate all of the resin. The base is easily removed from thin films, such as printed films, by volatilization into the air. It is obvious that the more volatile amines and ammonia would be lost most easily and the less volatile amines, such as triethanol amine, will be lost more slowly and only at higher temperatures, as long as the basic strength of the amines are the same. By choosing bases of different volatility and basic dissociation constant, the press stability and the temperature, required to set the ink after printing, can be controlled.

The varnish of Example V was found to remain open on the distributing system of a press for 25 minutes. When the morpholine, which has a vapor pressure of 8 mm. at 20° C., was replaced with the more volatile n-butyl amine, having a vapor pressure at 20° C. of 72 mm., the ink remained open for 15 minutes. The less volatile ethanol amine, with a vapor pressure of 0.4 mm. at 20° C., gave a varnish which would remain open on the press almost indefinitely.

Each of the above varnishes, when printed, would dry rapidly with heat at the appropriate temperature. The temperatures, required to dry in ten seconds for varnishes containing resin salts of n-butyl amine, ethylene diamine, morpholine and ethanol amine, were 68° C., 82° C., 76° C. and 64° C., respectively. In this case, the relatively higher boiling point of ethanol amine was balanced by its lower dissociation constant, so that it was removed as readily as the more volatile n-butyl amine.

The inks of this invention, when set by the application of heat, have a decided advantage over the usual heat set inks which depend on volatilization of a high boiling petroleum hydrocarbon. An ink, prepared from diethylene glycol, polymerized rosin, ethylene diamine and carbon black, was compared with a standard heat set ink prepared with a petroleum solvent base. The glycol ink set in 10 seconds at 80 C. while the standard heat set ink required 140° C. Under these conditions, the resin in the glycol ink precipitated and was filtered out as a solid layer by penetration of the released solvent into the paper. The resulting film had very considerable gloss. The standard ink, dried by volatilization of the solvent to leave the resin at a temperature above its melting point, whereby the resin penetrated the paper and no gloss was produced.

The second method, by which these varnishes and inks may be set, is by the application of moisture. In most cases, this type of setting is caused by hydrolysis of the resin salt to liberate the free base. This type of setting is therefore retarded by the presence of an excess of relatively nonvolatile base which suppresses the hydrolysis. The ink of Example XIII was printed on coated paper and exposed to steam for 2 seconds. The ink was completely dry and was non-tacky and water-insoluble. When the amount of amine in the original varnish was increased to 15 parts, the drying with steam was unsatisfactory.

The third method, of setting the varnishes or inks of my invention, is by means of acidic substances. Since the resins are weakly acidic substances, the base is quite easily replaced to free the resin which at once becomes insoluble.

The varnish of Example I was printed on coated paper and exposed for 5 seconds to 5% sulfur dioxide in air. The film was found to be completely dry. The same results were obtained with 3% formic acid at 120° F.

The ink of Example XV was printed on coated stock and exposed to steam containing 5% of acetic acid vapor.

The ink was completely set on a contact time of less than one second.

It will be understood that the preceding examples have been given for illustrative purposes solely and that my invention is not limited to the specific embodiments disclosed therein. On the other hand, it will be readily apparent to those skilled in the art that many variations can be made in the resin, the bases, and the solvents employed, in the proportions of the ingredients, and in the techniques used, within the limits hereinbefore set forth, without departing from the spirit or scope of my invention.

The inks of my invention, prepared from the varnishes of my invention, are suitable for high speed printing of coated magazine stock and will dry with the application of very little heat to give a hard and rubproof print which is insoluble in water and which exhibits almost no offset or show through. Such inks also give sharp reproduction on newsprint to produce a sheet which does not offset during printing and which will not smear or rub off.

It will be apparent that, by my invention, I have provided novel varnishes and printing inks which have many valuable advantageous properties. The varnishes and inks, which contain the resin salts of the less volatile amines, are particularly valuable because of their press stability. Accordingly, it will be apparent that my invention constitutes a valuable contribution to and advance in the art.

The invention claimed is:

1. An ink varnish consisting essentially of a salt of a water-insoluble resin having an acid number of at least 90 and a nitrogenous base containing no other elements than carbon, hydrogen, nitrogen and oxygen and having a basic dissociation constant greater than $1 \times 10^{-5}$, dissolved in a concentration of from about 20% to about 75% by weight in a liquid vehicle in which said salt is soluble and in which the free resin is insoluble which vehicle is a member of the group consisting of at least one neutral water-miscible aliphatic organic solvent selected from alcohols and glycols, ethers of glycols and esters of glycols which contain from 2 to 8 carbon atoms and only carbon, hydrogen and oxygen, and mixtures of such organic solvents with water.

2. An ink varnish consisting essentially of a salt of a water-insoluble resin having an acid number of at least 90 and a nitrogenous base containing no other elements than carbon, hydrogen, nitrogen and oxygen and having a basic dissociation constant greater than $1 \times 10^{-5}$ and a vapor pressure lower than 460 mm. of mercury at 20° C., dissolved in a concentration of from about 20% to about 75% by weight in a liquid vehicle in which said salt is soluble and in which the free resin is insoluble which vehicle is a member of the group consisting of at least one neutral water-miscible aliphatic organic solvent selected from alcohols and glycols, ethers of glycols and esters of glycols which contain from 2 to 8 carbon atoms and only carbon, hydrogen and oxygen, and mixtures of such organic solvents with water.

3. An ink varnish consisting essentially of a salt of a water-insoluble resin having an acid number of at least 90 and a nitrogenous base containing no other elements than carbon, hydrogen, nitrogen and oxygen and having a basic dissociation constant greater than $1 \times 10^{-5}$ and a vapor pressure lower than 100 mm. of mercury at 20° C., dissolved in a concentration of from about 20% to about 75% by weight in a liquid vehicle in which said salt is soluble and in which the free resin is insoluble which vehicle is a member of the group consisting of at least one neutral water-miscible aliphatic organic solvent selected from alcohols and glycols, ethers of glycols and esters of glycols which contain from 2 to 8 carbon atoms and only carbon, hydrogen and oxygen, and mixtures of such organic solvents with water.

4. An ink varnish consisting essentially of a salt of a water-insoluble resin having an acid number of at least 90 and a nitrogenous base containing no other elements than carbon, hydrogen, nitrogen and oxygen and having a basic dissociation constant greater than $1 \times 10^{-5}$ and a vapor pressure between 0.4 and 100 mm. of mercury at 20° C., dissolved in a concentration of from about 20% to about 75% by weight in a liquid vehicle in which said salt is soluble and in which the free resin is insoluble which vehicle is a member of the group consisting of at least one neutral water-miscible aliphatic organic solvent selected from alcohols and glycols, ethers of glycols and esters of glycols which contain from 2 to 8 carbon atoms and only carbon, hydrogen and oxygen, and mixtures of such organic solvents with water.

5. An ink varnish consisting essentially of a salt of a water-insoluble natural resin having an acid number of at least 90 and a nitrogenous base containing no other elements than carbon, hydrogen, nitrogen and oxygen and having a basic dissociation constant greater than $1 \times 10^{-5}$, dissolved in a concentration of from about 20% to about 75% by weight in a liquid vehicle in which said salt is soluble and in which the free resin is insoluble which vehicle is a member of the group consisting of at least one neutral water-miscible aliphatic organic solvent selected from alcohols and glycols, ethers of glycols and esters of glycols which contain from 2 to 8 carbon atoms and only carbon, hydrogen and oxygen, and mixtures of such organic solvents with water.

6. An ink varnish consisting essentially of a salt of a water-insoluble natural resin having an acid number of at least 90 and a nitrogenous base containing no other elements than carbon, hydrogen, nitrogen and oxygen and having a basic dissociation constant greater than $1 \times 10^{-5}$ and a vapor pressure lower than 100 mm. of mercury at 20° C., dissolved in a concentration of from about 20% to about 75% by weight in a liquid vehicle in which said salt is soluble and in which the free resin is insoluble which vehicle is a member of the group consisting of at least one neutral water-miscible aliphatic organic solvent selected from alcohols and glycols, ethers of glycols and esters of glycols which contain from 2 to 8 carbon atoms and only carbon, hydrogen and oxygen, and mixtures of such organic solvents with water.

7. An ink varnish consisting essentially of a salt of a water-insoluble resin having an acid number of at least 90 and a nitrogenous base containing no other elements than carbon, hydrogen, nitrogen and oxygen and having a basic dissociation constant greater than $1 \times 10^{-5}$ and dissolved in a concentration of from about 40% to about 60% by weight in a liquid vehicle in which said salt is soluble and in which the free resin is insoluble which vehicle is a member of the group consisting of at least one neutral water-miscible aliphatic organic solvent selected from alcohols and glycols, ethers of glycols and esters of glycols which contain from 2 to 8 carbon atoms and only carbon, hydrogen and oxygen, and mixtures of such organic solvents with water.

8. An ink varnish consisting essentially of a salt of a water-insoluble resin having an acid number of at least 90 and a nitrogenous base containing no other elements than carbon, hydrogen, nitrogen and oxygen and having a basic dissociation constant greater than $1 \times 10^{-5}$ and a vapor pressure lower than 100 mm. of mercury at 20° C., dissolved in a concentration of from about 40% to about 60% by weight in a liquid vehicle in which said salt is soluble and in which the free resin is insoluble which vehicle is a member of the group consisting of at least one neutral water-miscible aliphatic organic solvent selected from alcohols and glycols, ethers of glycols and esters of glycols which contain from 2 to 8 carbon atoms and only carbon, hydrogen and oxygen, and mixtures of such organic solvents with water.

9. An ink varnish consisting essentially of a salt of a water-insoluble natural resin having an acid number of at least 90 and a nitrogenous base containing no other elements than carbon, hydrogen, nitrogen and oxygen and having a basic dissociation constant greater than $1 \times 10^{-5}$ and a vapor pressure lower than 100 mm. of mercury at 20° C., dissolved in a concentration of from about 40% to about 60% by weight in a liquid vehicle in which said salt is soluble and in which the free resin is insoluble which vehicle is a member of the group consisting of at least one neutral water-miscible aliphatic organic solvent selected from alcohols and glycols, ethers of glycols and esters of glycols which contain from 2 to 8 carbon atoms and only carbon, hydrogen and oxygen, and mixtures of such organic solvents with water.

10. An ink varnish consisting essentially of a salt of a water-insoluble resin having an acid number of at least 90 and a nitrogenous base in the amount theoretically required to substantially completely neutralize the acidity of said resin, said base containing no other elements than carbon, hydrogen, nitrogen and oxygen and having a basic dissociation constant greater than $1 \times 10^{-5}$, dissolved in a concentration of from about 20% to about 75% by weight in a liquid vehicle in which said salt is soluble and in which the free resin is insoluble which vehicle is a member of the group consisting of at least one neutral water-miscible aliphatic organic solvent selected from alcohols and glycols, ethers of glycols and esters of glycols which contain from 2 to 8 carbon atoms and only carbon, hydrogen and oxygen, and mixtures of such organic solvents with water, and an excess of said base equal to not over 25% of said theoretically required amount.

11. An ink varnish consisting essentially of a salt of a water-insoluble resin having an acid number of at least 90 and a nitrogenous base in the amount theoretically required to substantially completely neutralize the acidity of said resin, said base containing no other elements than carbon, hydrogen, nitrogen and oxygen and having a basic dissociation constant greater than $1 \times 10^{-5}$ and a vapor pressure lower than 100 mm. of mercury at 20° C., dissolved in a concentration of from about 20% to about 75% by weight in a liquid vehicle in which said salt is soluble and in which the free resin is insoluble which vehicle is a member of the group consisting of at least one neutral water-miscible aliphatic organic solvent selected from alcohols and glycols, ethers of glycols and esters of glycols which contain from 2 to 8 carbon atoms and only carbon, hydrogen and oxygen, and mixtures of such organic solvents with water, and an excess of said base equal to not over 25% of said theoretically required amount.

12. An ink varnish consisting essentially of a salt of a water-insoluble natural resin having an acid number of at least 90 and a nitrogenous base in the amount theoretically required to substantially completely neutralize the acidity of said resin, said base containing no other elements than carbon, hydrogen, nitrogen and oxygen and having a basic dissociation constant greater than $1 \times 10^{-5}$ and a vapor pressure lower than 100 mm. of mercury at 20° C., dissolved in a concentration of from about 20% to about 75% by weight in a liquid vehicle in which said salt is soluble and in which the free resin is insoluble which vehicle is a member of the group consisting of at least one neutral water-miscible aliphatic organic solvent selected from alcohols and glycols, ethers of glycols and esters of glycols, which contain from 2 to 8 carbon atoms and only carbon, hydrogen and oxygen, and mixtures of such organic solvents with water, and an excess of said base equal to not over 25% of said theoretically required amount.

13. An ink varnish consisting essentially of a salt of rosin and a nitrogenous base containing no other elements than carbon, hydrogen, nitrogen and oxygen and having a basic dissociation constant greater than $1 \times 10^{-5}$, dissolved in a concentration of from about 20% to about 75% by weight in a liquid vehicle in which said salt is soluble and in which the free rosin is insoluble which vehicle is a member of the group consisting of at least one neutral water-miscible aliphatic organic solvent selected from alcohols and glycols, ethers of glycols and esters of glycols which contain from 2 to 8 carbon atoms and only carbon, hydrogen and oxygen, and mixtures of such organic solvents with water.

14. An ink varnish consisting essentially of a salt of rosin and a nitrogenous base containing no other elements than carbon, hydrogen, nitrogen and oxygen and having a basic dissociation constant greater than $1 \times 10^{-5}$ and a vapor pressure lower than 100 mm. of mercury at 20° C., dissolved in a concentration of from about 20% to about 75% by weight in a liquid vehicle in which said salt is soluble and in which the free rosin is insoluble which vehicle is a member of the group consisting of at least one neutral water-miscible aliphatic organic solvent selected from alcohols and glycols, ethers of glycols and esters of glycols which contain from 2 to 8 carbon atoms and only carbon, hydrogen and oxygen, and mixtures of such organic solvents with water.

15. An ink varnish consisting essentially of a salt of a polymerized rosin having an acid number of at least 90 and a nitrogenous base containing no other elements than carbon, hydrogen, nitrogen and oxygen and having a basic dissociation constant greater than $1 \times 10^{-5}$, dissolved in a concentration of from about 20% to about 75% by weight in a liquid vehicle in which said salt is soluble and in which the free polymerized rosin is insoluble which vehicle is a member of the group consisting of at least one neutral water-miscible aliphatic organic solvent selected from alcohols and glycols, ethers of glycols and esters of glycols which contain from 2 to 8 carbon atoms and only carbon, hydrogen and oxygen, and mixtures of such organic solvents with water.

16. An ink varnish consisting essentially of a salt of a polymerized rosin having an acid number of at least 90 and a nitrogenous base containing no other elements than carbon, hydrogen, nitrogen and oxygen and having a basic dissociation constant greater than $1 \times 10^{-5}$ and a vapor pressure lower than 100 mm. of mercury at 20° C., dissolved in a concentration of from about 20% to about 75% by weight in a liquid vehicle in which said salt is soluble and in which the free polymerized rosin is insoluble which vehicle is a member of the group consisting of at least one neutral water-miscible aliphatic organic solvent selected from alcohols and glycols, ethers of glycols and esters of glycols which contain from 2 to 8 carbon atoms and only carbon, hydrogen and oxygen, and mixtures of such organic solvents with water.

17. A printing ink consisting essentially of coloring matter and a varnish; which varnish consists essentially of a salt of a water-insoluble resin having an acid number of at least 90 and a nitrogenous base containing no other elements than carbon, hydrogen, nitrogen and oxygen and having a basic dissociation constant greater than $1 \times 10^{-5}$, dissolved in a concentration of from about 20% to about 75% by weight in a liquid vehicle in which said salt is soluble and in which the free resin is insoluble which vehicle is a member of the group consisting of at least one neutral water-miscible aliphatic organic solvent selected from alcohols and glycols, ethers of glycols and esters of glycols which contain from 2 to 8 carbon atoms and only carbon, hydrogen and oxygen, and mixtures of such organic solvents with water.

18. A printing ink consisting essentially of coloring matter and a varnish; which varnish consists essentially of a salt of a water-insoluble resin having an acid number of at least 90 and a nitrogenous base containing no other elements than carbon, hydrogen, nitrogen and oxygen and having a basic dissociation constant greater than $1 \times 10^{-5}$ and a vapor pressure lower than 460 mm. of mercury at 20° C., dissolved in a concentration of from about 20% to about 75% by weight in a liquid vehicle in which said salt is soluble and in which the free resin is insoluble which vehicle is a member of the group consisting of at least one neutral water-miscible aliphatic organic solvent selected from alcohols and glycols, ethers of glycols and esters of glycols which contain from 2 to 8 carbon atoms and only carbon, hydrogen and oxygen, and mixtures of such organic solvents with water.

19. A printing ink consisting essentially of coloring matter and a varnish; which varnish consists essentially of a salt of a water-insoluble resin having an acid number of at least 90 and a nitrogenous base containing no other elements than carbon, hydrogen, nitrogen and oxygen and having a basic dissociation constant greater than $1 \times 10^{-5}$ and a vapor pressure lower than 100 mm. of mercury at 20° C., dissolved in a concentration of from about 20% to about 75% by weight in a liquid vehicle in which said salt is soluble and in which the free resin is insoluble which vehicle is a member of the group consisting of at least one neutral water-miscible aliphatic organic solvent selected from alcohols and glycols, ethers of glycols and esters of glycols which contain from 2 to 8 carbon atoms and only carbon, hydrogen and oxygen, and mixtures of such organic solvents with water.

20. A printing ink consisting essentially of coloring matter and a varnish; which varnish consists essentially of a salt of a water-insoluble natural resin having an acid number of at least 90 and a nitrogenous base containing no other elements than carbon, hydrogen, nitrogen and oxygen and having a basic dissociation constant greater than $1 \times 10^{-5}$ and a vapor pressure lower than 100 mm. of mercury at 20° C., dissolved in a concentration of from about 20% to about 75% by weight in a liquid vehicle in which said salt is soluble and in which the free resin is insoluble which vehicle is a member of the group consisting of at least one neutral water-miscible aliphatic organic solvent selected from alcohols and glycols, ethers of glycols and esters of glycols which contain from 2 to 8 carbon atoms and only carbon, hydrogen and oxygen, and mixtures of such organic solvents with water.

References Cited in the file of this patent

UNITED STATES PATENTS

| | | |
|---|---|---|
| 2,100,408 | Platt | Nov. 30, 1937 |
| 2,385,613 | Davis | Sept. 25, 1945 |
| 2,436,954 | Denton | Mar. 2, 1948 |
| 2,497,546 | Griffin | Feb. 14, 1950 |
| 2,540,776 | Cadwell | Feb. 6, 1951 |

FOREIGN PATENTS

| | | |
|---|---|---|
| 376,413 | Great Britain | July 14, 1932 |
| 468,384 | Great Britain | July 2, 1937 |
| 598,551 | Great Britain | Feb. 20, 1948 |
| 599,232 | Great Britain | Mar. 8, 1948 |
| 397,855 | France | May 19, 1909 |